US012630250B2

(12) United States Patent
Nose

(10) Patent No.: US 12,630,250 B2
(45) Date of Patent: May 19, 2026

(54) STEERING ASSIST DEVICE

(71) Applicant: HONDA MOTOR CO., LTD., Tokyo (JP)

(72) Inventor: Tsubasa Nose, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 123 days.

(21) Appl. No.: 18/693,182

(22) PCT Filed: Jul. 8, 2022

(86) PCT No.: PCT/JP2022/027164
§ 371 (c)(1),
(2) Date: Mar. 19, 2024

(87) PCT Pub. No.: WO2023/047764
PCT Pub. Date: Mar. 30, 2023

(65) Prior Publication Data
US 2024/0286699 A1 Aug. 29, 2024

(30) Foreign Application Priority Data
Sep. 27, 2021 (JP) ................................. 2021-157088

(51) Int. Cl.
*B62J 45/415* (2020.01)
*B62K 21/00* (2006.01)

(52) U.S. Cl.
CPC ........... *B62J 45/4151* (2020.02); *B62K 21/00* (2013.01)

(58) Field of Classification Search
CPC .............................. B62J 45/4151; B62K 21/00
USPC ......................................................... 701/41
See application file for complete search history.

(56) References Cited

U.S. PATENT DOCUMENTS

2014/0129086 A1* 5/2014 Takenaka ............... B62K 21/00
                                                            701/41
2018/0265158 A1 9/2018 Hara et al.

FOREIGN PATENT DOCUMENTS

EP        2476605 A1   7/2012
JP     2012-148656 A   8/2012
JP     2014-091386 A   5/2014
(Continued)

OTHER PUBLICATIONS

International Search Report corresponding to International Application No. PCT/JP2022/027164 dated Sep. 20, 2022, 2 pages.
(Continued)

*Primary Examiner* — Lindsay M Low
*Assistant Examiner* — Omar Morales
(74) *Attorney, Agent, or Firm* — Rankin, Hill & Clark LLP

(57) ABSTRACT

A steering assist device that appropriately controls swaying of a vehicle body while a rider is walking by pushing the vehicle body by the hands and thereby eliminates the anxiety of the rider about the support of the vehicle body. A steering assist device includes a steering actuator that provides an assist torque that generates a steering angle of a steered wheel to a suspension device that supports the steered wheel; roll angle detector that detects a roll angle of a vehicle body; and controller that controls the assist torque provided by the steering actuator based on the roll angle of the vehicle body and a target roll angle. The controller sets the roll angle of when the vehicle body is inclined from an upright state to the target roll angle.

4 Claims, 7 Drawing Sheets

(56)     References Cited

FOREIGN PATENT DOCUMENTS

| | | |
|---|---|---|
| JP | 2021-054328 A | 4/2021 |
| WO | 2017/086352 A1 | 5/2017 |

OTHER PUBLICATIONS

Written Opinion corresponding to International Application No. PCT/JP2022/027164 dated Sep. 20, 2022, 4 pages.
International Preliminary Report on Patentability dated Apr. 2, 2024, Application No. PCT/JP2022/027164; 6 pages.

* cited by examiner

FIG.6

STEERING ASSIST DEVICE

TECHNICAL FIELD

The present invention relates to a steering assist device.

BACKGROUND ART

In saddle-riding vehicles such as motorcycles, a steering assist device has been known to improve the stability of a vehicle body during traveling by steering control to control a steering angle of a steered wheel (see, for example, Patent Literature 1).

CITATION LIST

Patent Literature

[Patent Literature 1]
Japanese Patent Laid-Open No. 2021-54328

SUMMARY OF INVENTION

Technical Problem

Incidentally, a rider sometimes dismounts from a saddle-riding vehicle and walks while pushing a vehicle body with the hands. While walking, the rider needs to support the vehicle body to prevent the vehicle body from falling. The rider supports the vehicle body by grasping the handle of the vehicle while standing beside the vehicle body. According to the technology in Patent Literature 1, which deems the control during travelling as prerequisite, the vehicle is controlled to maintain its upright state even for support during push-walking. Accordingly, the rider feels anxious about being unable to support the vehicle when the vehicle is about to fall to the side opposite to the side where the rider is standing.

An object of the present invention is to provide a steering assist device that appropriately controls swaying of a vehicle body while a rider is walking by pushing the vehicle body by the hands and thereby eliminates the anxiety of the rider about the support of the vehicle body.

Solution to Problem

This application includes Japanese Patent Application 2021-157088 filed on Sep. 27, 2021 in its entirety.

One aspect of the present invention relates to a steering assist device for a saddle-riding vehicle that generates a steering angle at a steered wheel, including: a steering actuator that provides an assist torque that generates the steering angle of the steered wheel to a suspension device that supports the steered wheel; roll angle detection means that detects a roll angle that is an angle of inclination of a vehicle body in a roll direction; and control means that controls the assist torque provided by the steering actuator based on the roll angle of the vehicle body and a target roll angle that is a target value of the roll angle, in which the control means sets the roll angle of when the vehicle body is inclined from an upright state to the target roll angle.

Advantageous Effects of Invention

One aspect of the present invention can appropriately control swaying of a vehicle body while a rider is walking by pushing the vehicle body by the hands and thereby eliminate the anxiety of the rider about the support of the vehicle body.

BRIEF DESCRIPTION OF DRAWINGS

FIG. 6 shows the relationship between the motion of the rider in push-walking and assist torque providing control.

DESCRIPTION OF EMBODIMENT

Figure 1:
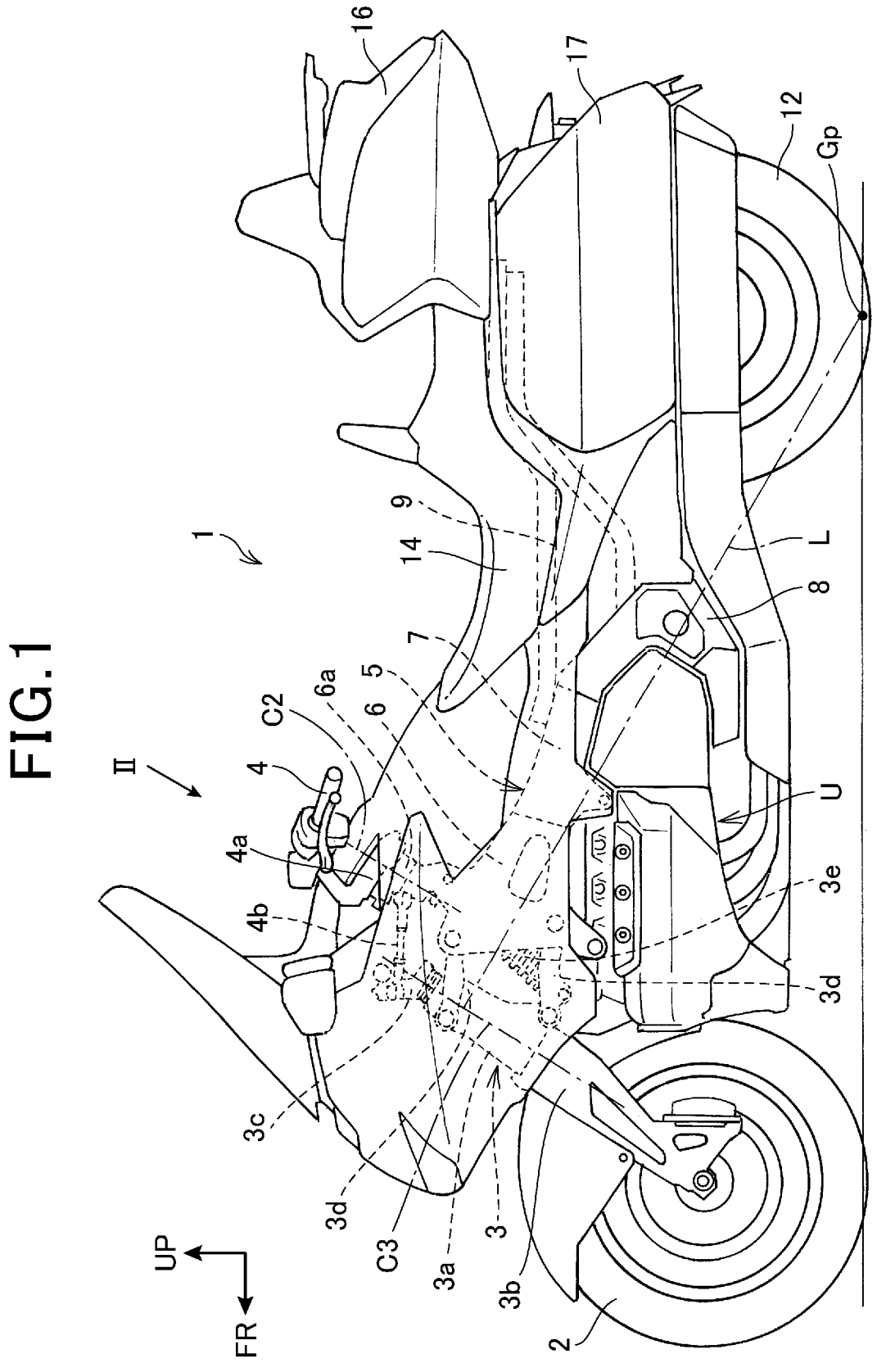
FIG. 1 is a side view of a motorcycle according to an embodiment of the present invention.

An embodiment of the present invention will be described below with reference to the drawings. Note that the directions, such as front, rear, left, and right directions, in the description below are the same as the directions in a vehicle described below unless otherwise stated. In the drawings used for the following description, an arrow FR indicating the front side of the vehicle, an arrow LH indicating the left side of the vehicle, an arrow UP indicating the upper side of the vehicle, and a line CL indicating a left-right center of the vehicle are shown as appropriate.

<Vehicle as Whole>

As shown in FIG. 1, a saddle-riding vehicle in the present embodiment is a motorcycle 1 including a large cowling. The motorcycle 1 has a front wheel 2 that is a steered wheel, which is supported by a front-wheel suspension device 3. The front-wheel suspension device 3 is supported by a front end part of a vehicle body frame 5 that constitutes a vehicle body. At the front end part of the vehicle body frame 5, a front block 6 is provided to support the front-wheel suspension device 3. On the upper part of the front block 6, a bar handle 4 for front wheel steering is provided. The bar handle 4 includes a pair of left and right grips that are gripped by a rider (also called a driver or an occupant) J (see FIG. 6).

Behind the front block 6, a pair of left and right mainframes 7 extend obliquely downward to the rear. A rear end part of the pair of left and right mainframes 7 is connected to an upper end part of a pair of left and right pivot frames 8. Below the pair of the left and right mainframes 7 and in front of the pair of left and right pivot frames 8, a power unit U is mounted. The power unit U includes, for example, a horizontally opposed six cylinder-type engine.

The pair of left and right pivot frames 8 support a front end part of a swing arm. A rear end part of the swing arm supports a rear wheel 12 of the motorcycle 1. Between a front part of the swing arm and a front-rear center part of the vehicle body frame 5, an unillustrated rear cushion is interposed.

A rear part of the pair of left and right pivot frames 8 is connected to a front end part of a rear frame 9. Above the rear frame 9, a seat 14 is arranged for an occupant to seat. Below the seat 14, a fuel tank is arranged. Behind the seat 14, a rear trunk 16 is arranged. On both the right and left sides below the rear trunk 16, a pair of left and right saddle bags 17 are arranged, respectively.

3

<Front-Wheel Suspension Device>

The front-wheel suspension device 3 includes a handle support part 6a provided on the upper end part of the front block 6, a handle post 4a rotatably supported by the handle support part 6a, a head pipe 3a that is separate from the vehicle body frame 5, a front fork member 3b rotatably supported by the head pipe 3a, a turning member 3c attached to an upper end part of the front fork member 3b so as to be integrally rotatable, a link member 4b that couples the turning member 3c and the handle post 4a, a swing arm 3d that swingably couples the head pipe 3a with the front block 6, and a cushion unit 3e interposed between the front fork member 3b and the front block 6.

The front fork member 3b supports the front wheel 2 on each lower end of left and right forks. At an upper end part of the front fork member 3b, a steering shaft is integrally provided, and the steering shaft is inserted into the head pipe 3a and is supported by the head pipe 3a. The steering shaft has an upper end part protruding above the head pipe 3a, with the turning member 3c being attached to the upper end part.

Hereafter, a rotational center shaft line of the handle post 4a with respect to the handle support part 6a is referred to as a handle rotation shaft line C2. In addition, a rotational center shaft line of the front fork member 3b with respect to the head pipe 3a is referred to as a steering shaft line C3. The steering shaft line C3 is offset (separated) forward beyond the handle rotation shaft line C2. The steering shaft line C3 and the handle rotation shaft line C2 are substantially parallel to each other in a 1 G state of the vehicle.

Figure 2:
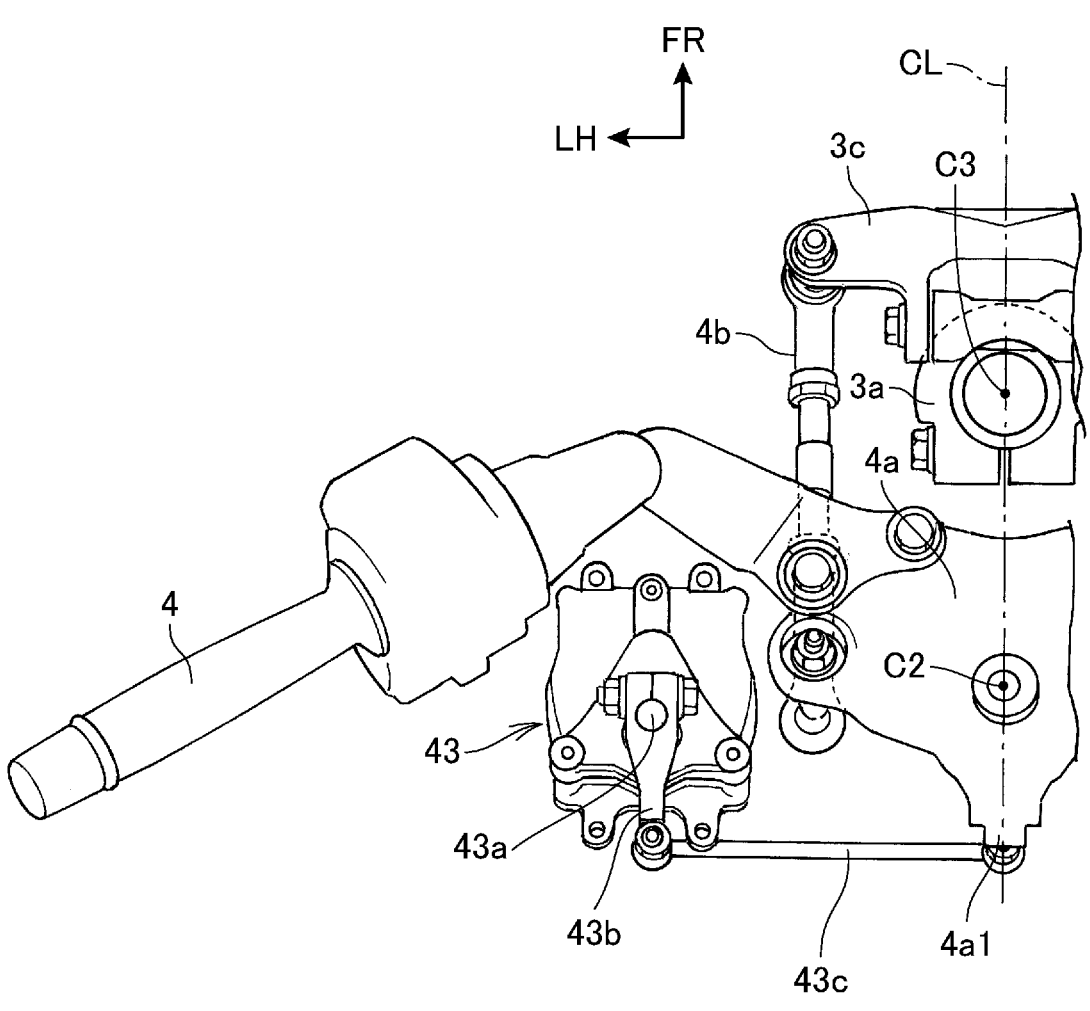
FIG. 2 shows the configuration of a control device included in the motorcycle.

FIG. 2 is a view taken in an arrow II direction along the steering shaft line C3 and the handle rotation shaft line C2 in FIG. 1. In FIG. 2, the link member 4b forms a parallel link with the turning member 3c and the handle post 4a. Accordingly, a steering angle of the bar handle 4 and a steering angle of the front wheel 2 become identical to each other.

With referring to FIG. 1, the front end part of the swing arm 3d is supported by the head pipe 3a so as to be swingable in an up-down direction, while the rear end part of the swing arm 3d is supported by the front block 6 so as to be swingable in the up-down direction. The swing arm 3d includes a pair of upper and lower arm members. The swing arm 3d allows the head pipe 3a to move up and down with a specified locus. For example, the lower arm member is coupled to a lower end part of the cushion unit 3e.

The front-wheel suspension device 3 swings the swing arm 3d upward to move the front fork member 3b and the head pipe 3a upward. In this movement, the lower arm member moves the lower end part of the cushion unit 3e upward and compresses the cushion unit 3e.

The front-wheel suspension device 3 swings the swing arm 3d downward to move the front fork member 3b and the head pipe 3a downward. In this movement, the lower arm member moves the lower end part of the cushion unit 3e downward and expands the cushion unit 3e.

<Control Device>

Figure 3:
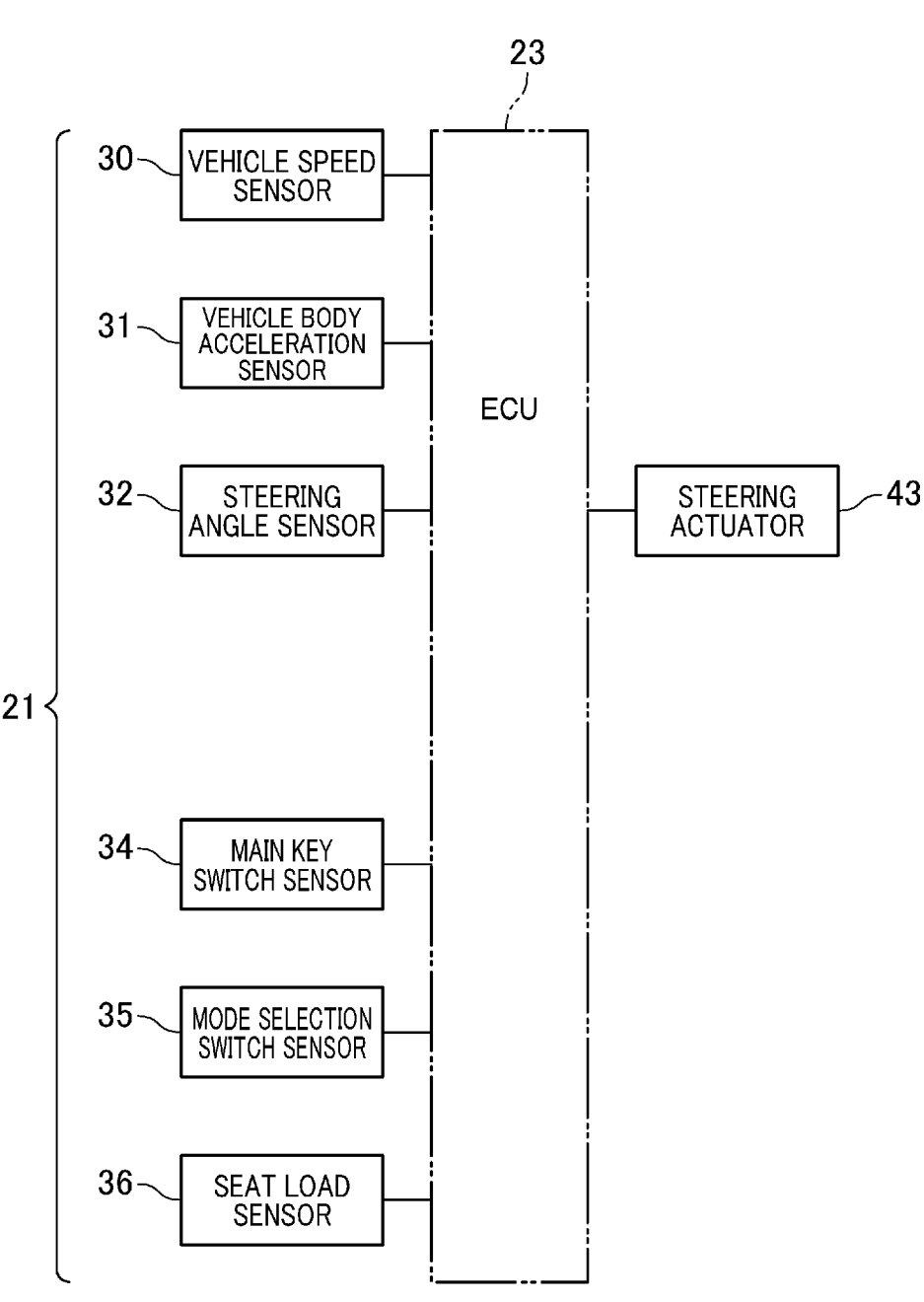
FIG. 3 is a configuration diagram of the control device for the motorcycle.

FIG. 3 is a configuration diagram of a control device 23 of the motorcycle 1 in the present embodiment.

The motorcycle 1 includes the control device 23 that controls various devices based on the detection information acquired from various sensors 21. The control device 23 includes, for example, an electronic control unit (ECU), which is an example of one or more computers. Specifically, the ECU includes a processor such as a CPU or an MPU, a memory device such as a ROM or a RAM, and an interface circuit that connects the sensors 21 and devices. Note that at least part of the control device 23 may be implemented through collaboration of software and hardware.

The sensors 21 include a vehicle speed sensor 30, a vehicle body acceleration sensor 31, a steering angle sensor 32, a main key switch sensor 34, the mode selection switch sensor 35, and a seat load sensor 36.

The sensors 21 detect various operation inputs of the rider J, and various states of the motorcycle 1 and the rider J. The sensors 21 output various detection information to the control device 23.

The vehicle speed sensor 30 detects, for example, the rotational speed of an output shaft of the power unit U of the motorcycle 1, detects the rotational speed of the rear wheel 12 from the detected rotational speed, and detects the vehicle speed of the motorcycle 1 based on the detected rotational speed. Note that the vehicle speed may be detected based on wheel speed information from at least one of an anti-lock brake system (ABS)-ECU and a traction control system (TCS)-ECU.

The vehicle body acceleration sensor 31, which is a five-axis or six-axis inertial measurement unit (IMU), detects angular velocities and acceleration of three axes (a roll axis, a pitch axis, and a yaw axis) in the vehicle body, and further detects an angle from the detection results.

The steering angle sensor 32 is, for example, a potentiometer provided on the steering shaft (the steering shaft or the handle rotation shaft) to detect the steering angle of the front wheel 2 that is the steered wheel.

The main key switch sensor 34 is a sensor provided in a key cylinder into which the main key is inserted to detect rotational operation of the inserted main key. When the rotational operation of the main key is performed. The motorcycle 1 is powered on and the power unit U is allowed to be started.

The mode selection switch sensor 35 is a sensor that detects an operation state of the switch operated by the rider J. The switch is used to select the push-walking mode. The "push-walking" refers to that the rider J is walking while pushing the vehicle body by the hands with the rider J standing on the left side or the right side of the vehicle body. In the present embodiment, the rider J is assumed to stand on the left side of the vehicle body.

The seat load sensor 36 is a sensor that detects the load applied to the seat 14. It is possible to determine whether the rider J is seated or not based on the value of the load. Hereinafter, the weight applied to the seat 14 is called a seat weight.

In the front-wheel suspension device 3 in the present embodiment, the rotation shaft of the handle post 4a supporting the bar handle 4 is separate from the steering shaft that allows operation of the front wheel 2, though the front-wheel suspension device 3 is not limited to this configuration. For example, as in typical front-wheel suspension devices, a configuration in which the handle rotation shaft and the steering shaft (front wheel rotation shaft) are identical to each other, or a configuration in which the front-wheel suspension device 3 is supported by the head pipe at the front end part of the vehicle body frame 5 may also be adopted.

The devices include at least a steering actuator 43. The steering actuator 43 includes an electric motor that is its own drive source. The steering actuator 43 operates the electric motor based on the control by the control device 23 to provide a torque to the front-wheel suspension device 3 that allows a steering angle to be generated at the front wheel 2. The steering actuator 43 includes an ECU that electrically controls the operation of the electric motor that is its own drive source.

The steering actuator 43 is arranged on the left side of the handle support part 6a and attached to the vehicle body frame 5. With reference to FIG. 2, the steering actuator 43 is arranged so that a drive shaft 43a of the electric motor, which is a drive source of the steering actuator 43, is parallel to the handle rotation shaft. The drive shaft 43a has a swing arm 43b attached so as to be rotatable integrally with the drive shaft 43a. The swing arm 43b is coupled with an actuator coupling part 4al of the handle post 4a via a coupling rod 43c. This allows the drive force (torque) of the electric motor included in the steering actuator 43 to be transferred to the handle post 4a, and thereby a steering angle is generated at the front wheel 2.

<Steering Assist Control>

The vehicle body acceleration sensor 31 is provided on the vehicle body frame 5 that constitutes the vehicle body of the motorcycle 1. With reference to FIG. 1, for example, the vehicle body acceleration sensor 31 is arranged in the vicinity of a line L connecting a ground point Gp of the rear wheel 12 and a substantially central part of the head pipe 3a in a side view. The vehicle body acceleration sensor 31 detects the angular velocity of the motorcycle 1 in the roll direction. Hereinafter, the angular velocity in the roll direction is called a roll angular velocity Y, and the angle of inclination of the vehicle body in the roll direction is called a roll angle Yθ. Note that the vehicle body in the embodiment includes the vehicle body frame 5 as well as members that roll in an integrated manner with the vehicle body frame 5.

Figure 4:
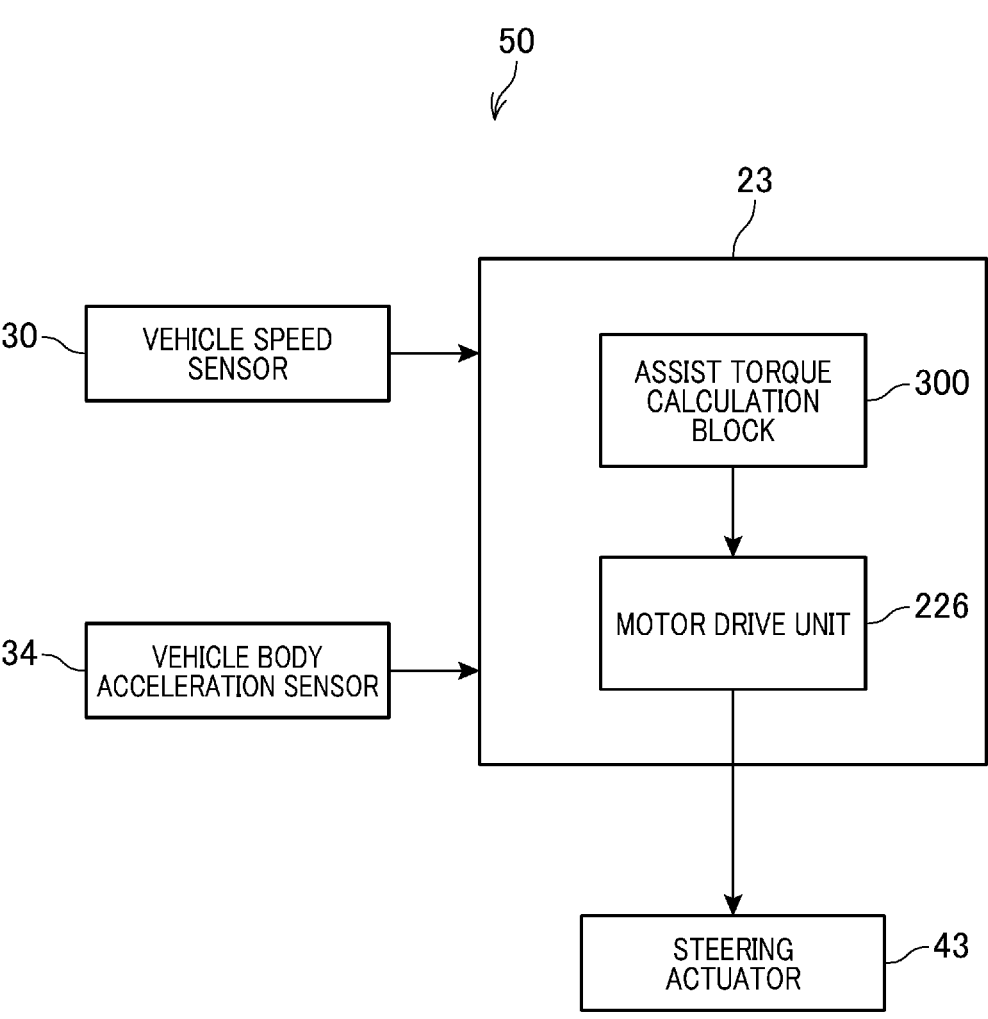
FIG. 4 is a block diagram of a steering assist device.

FIG. 4 is a block diagram of a steering assist device 50.

The steering assist device 50 is a device that assists the steering of the rider J by providing a torque to the front-wheel suspension device 3 to generate a steering angle at the front wheel 2 when the push-walking mode is selected. When the roll angle of the vehicle body changes due to the swaying of the vehicle body in push-walking, the steering assist device 50 provides torque to the front-wheel suspension device 3 so as to restrain the change. Hereinafter, the torque provided by the steering assist device 50 to the front-wheel suspension device 3 is referred to as an assist torque.

The steering assist device 50 includes the vehicle speed sensor 30, the vehicle body acceleration sensor 31, the control device 23, and the steering actuator 43. The control device 23 also includes an assist torque calculation block 300 and a motor drive unit 226.

When the push-walking mode is selected, the assist torque calculation block 300 calculates an assist torque Tw to be provided to the front-wheel suspension device 3 based on the roll angle Yθ and a target roll angle Yθt. The assist torque calculation block 300 in the present embodiment calculates the assist torque Tw when the vehicle body is moving at speed that can be regarded as push-walking by the rider J.

The roll angle Yθ is calculated by time integration of the roll angular velocity Y based on detection information from the vehicle body acceleration sensor 31.

The target roll angle Yθt is the roll angle Yθ, which is easy for the rider J to push-walk by stabilizing the vehicle body. The target roll angle Yθt is set to the roll angle Yθ formed when the vehicle body is in an inclined state from the upright state. The upright state of the vehicle body is the state in which the left-right center line CL of the vehicle body is in a perpendicular direction. The target roll angle Yθt depends on various factors, such as the rider J, the motorcycle 1, and road surfaces. In the present embodiment, an appropriate target roll angle Yθt is set every time the push-walking mode is selected. Note that the setting of the target roll angle Yθt will be described in detail later.

The assist torque Tw is the torque provided to the front-wheel suspension device 3 to maintain the roll angle Yθ of the vehicle body at the target roll angle Yθt. For example, when the vehicle body inclines to the left beyond the target roll angle Yθt, the assist torque Tw acts in the direction of turning the front wheel 2 to the left. This creates a centrifugal force in the right direction in the vehicle body. Contrary to this, when, for example, the vehicle body inclines to the right beyond the target roll angle Yθt, the assist torque Tw acts in the direction of turning the front wheel 2 to the right. This generates a centrifugal force in the left direction in the vehicle body. When such assist torque Tw is provided to the front-wheel suspension device 3 and thereby centrifugal force is generated, the inclination (the roll angle Yθ) of the vehicle body is guided to be the target roll angle Yθt, which enables the rider J to walk while stably pushing the vehicle body.

The motor drive unit 226 converts the assist torque Tw into a torque current and supplies the torque current to the electric motor of the steering actuator 43. The electric motor drives while the torque current is supplied, and generates a driving force according to the torque current. The driving force of the electric motor is transferred to the handle post 4a via the coupling rod 43c or the like to assist the rotation of the front wheel 2. This means that the front wheel 2 is provided with the driving force (auxiliary force) corresponding to the assist torque Tw.

<Operation of Steering Assist Device>

Figure 5:
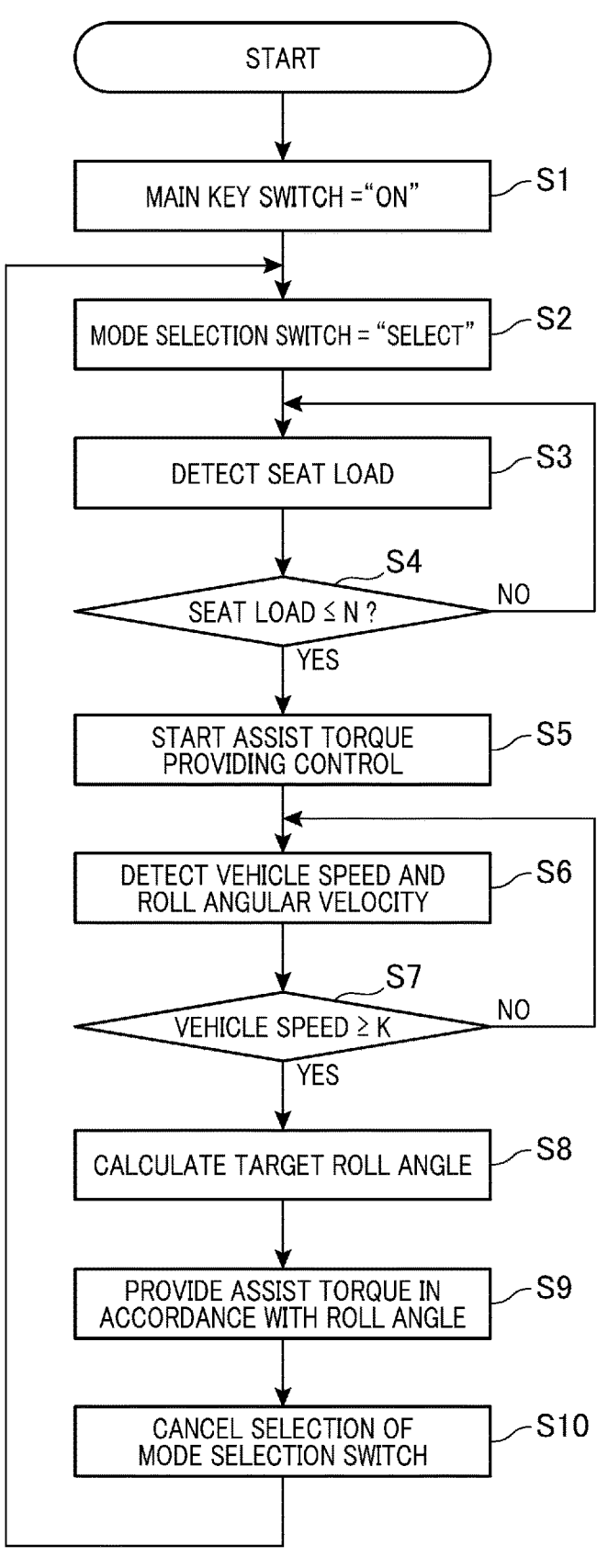
FIG. 5 is a flowchart showing the operation of the steering assist device.

FIG. 5 is a flowchart showing the operation of the steering assist device 50.

When the rider J performs rotation operation of the main key, the main key switch sensor 34 detects that the main key switch is turned on (step S1). Then, when the rider J operates the mode selection switch to select the push-walking mode, the mode selection switch sensor 35 detects the selection (step S2). When the push-walking mode is selected, the control device 23 advances the processing procedure to step S3 to start processing of various kinds to assist the push-walking.

Specifically, the control device 23 first acquires detection information of the seat load sensor 36 to detect a seat load (step S3). Next, the control device 23 determines whether or not the seat load is equal to or less than a prescribed load threshold N (step S4). The prescribed load threshold N is the threshold of the load with which the rider J can be regarded as being seated on the seat 14. Therefore, when the seat load is larger than the load threshold N (step S4: No), the rider J is regarded to be seated on the seat 14. In this case, since the push-walking is not performed, the control device 23 returns the processing procedure to step S3. This prevents execution of the assist torque providing control in step S5 and subsequent steps while the rider J is riding on the vehicle.

Meanwhile, when the seat load is equal to or less than the load threshold N (step S4: Yes), it indicates that the rider J is not seated on the seat 14, that is, the rider J is in a state of dismounting and is ready to perform push-walking. In this case, the control device 23 starts the assist torque providing control (step S5). The assist torque providing control is the control to provide the assist torque Tw to the front-wheel suspension device 3 to maintain the roll angle Yθ of the vehicle body at the target roll angle Yθt. As the assist torque providing control is started, the assist torque Tw is provided so as to maintain the inclination of the vehicle body at the target roll angle Yθt even when the vehicle body sways. Hence, the vehicle is maintained at an appropriate inclination that makes it easier for the rider J to perform the push-walking.

In the assist torque providing control, the control device 23 first detects the vehicle speed based on the detection information from the vehicle speed sensor 30, and also detects the roll angle Yθ based on the detection information from the vehicle body acceleration sensor 31 (step S6).

Next, the control device 23 determines whether or not the vehicle speed is equal to or more than a prescribed vehicle speed threshold K (step S7). The vehicle speed threshold K is the speed at which the vehicle body can be regarded as moving by the push-walking of the rider J. When the vehicle speed is below the vehicle speed threshold K (step S7: No), the push-walking is not yet performed, and so the control device 23 returns the processing procedure to step S6.

Meanwhile, when the vehicle speed is equal to or more than the vehicle speed threshold K (step S7: Yes), it indicates that the rider J has started to perform the push-walking for the first time after the start of the assist torque providing control in step S5. In this case, the control device 23 calculates the target roll angle Yθt used for the assist torque providing control (step S8). The calculation of the target roll angle Yθt will be described in detail later.

The control device 23 then starts feedback control that provides the assist torque Tw in accordance with the roll angle Yθ (step S9). Specifically, in the control device 23, the assist torque calculation block 300 calculates the assist torque Tw, which reduces the deviation between the roll angle Yθ and the target roll angle Yθt to zero, and the motor drive unit 226 controls the steering actuator 43 to provide the torque corresponding to the assist torque Tw to the front-wheel suspension device 3.

The feedback control is then continued until the rider J operates the mode selection switch and cancels the push-walking mode. When the push-walking mode is canceled (step S10), the control device 23 returns the processing procedure to step S2, and when the push-walking mode is selected next time (step S2), the control device 23 executes the processing of step S3 and subsequent steps again.

The calculation of the target roll angle Yθt in step S8 and the provision of the assist torque Tw in step S9 shown in FIG. 5 will be described in more detail.

Figure 6:
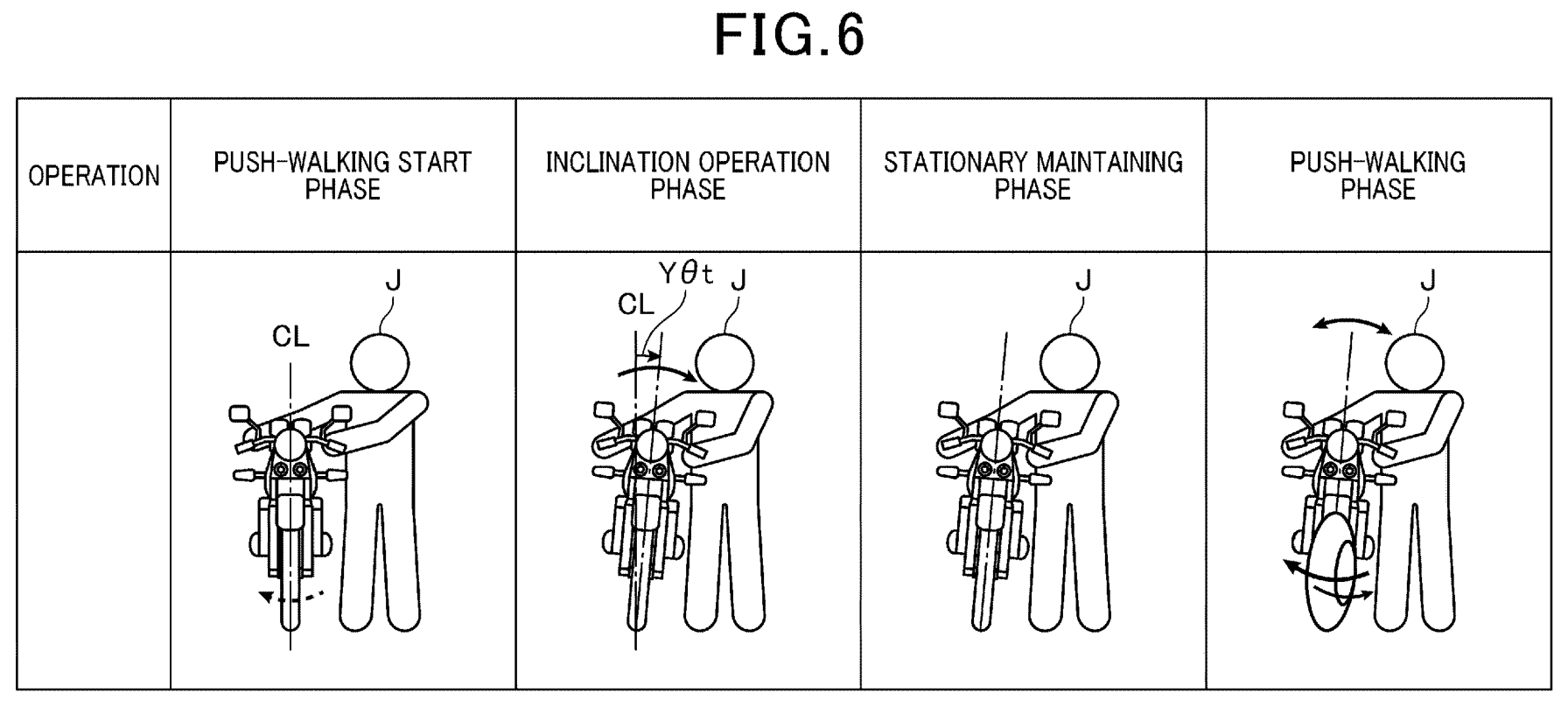
Figure 7:
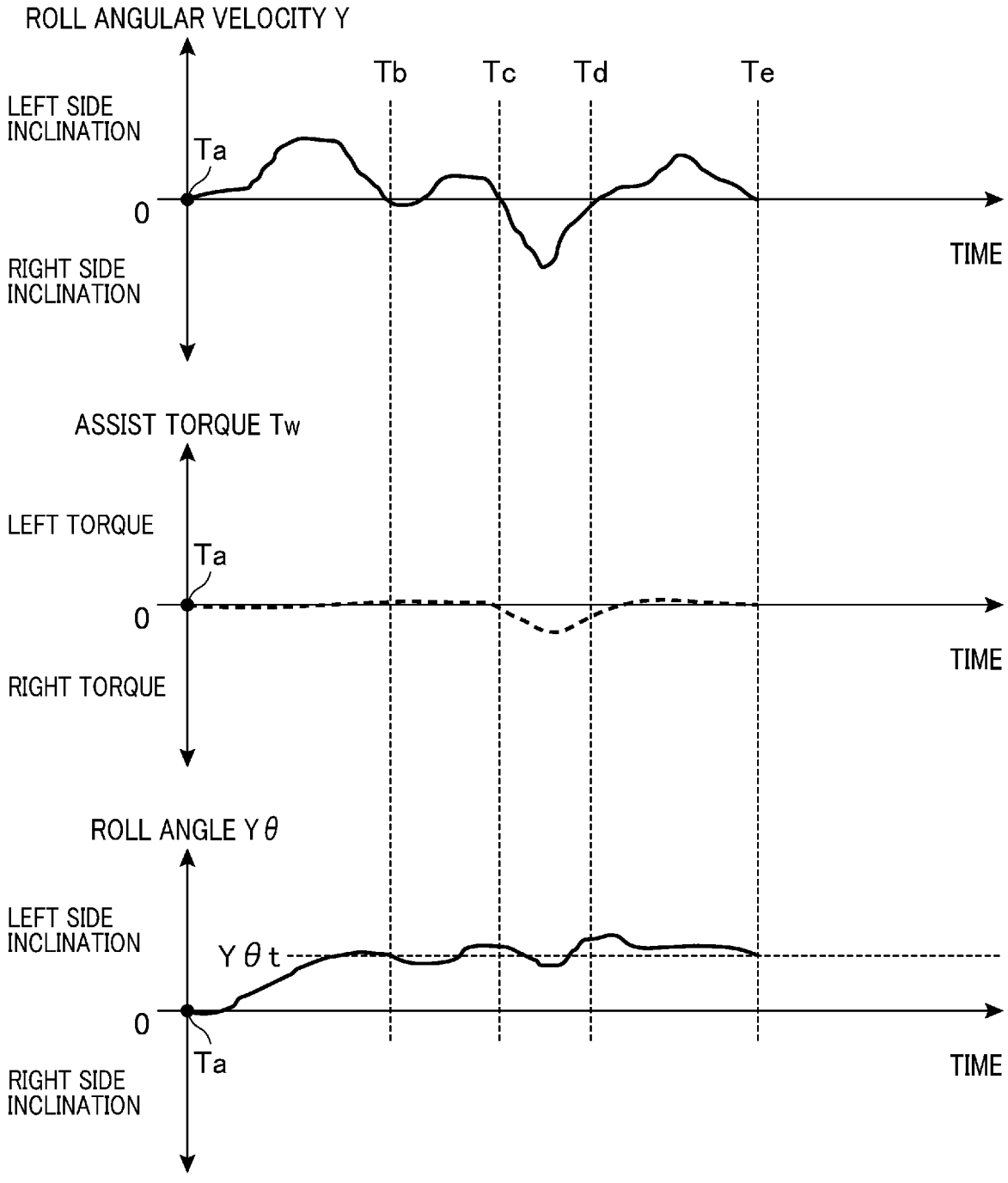
FIG. 7 shows timing charts of a roll angular velocity, a roll angle, and an assist torque in the assist torque providing control.

FIG. 6 shows the relationship between the motion of the rider J in pushing walking and the assist torque providing control, and FIG. 7 shows timing charts of the roll angular velocity, the roll angle Yθ, and the assist torque Tw in the assist torque providing control.

As shown in FIG. 6, when the rider J stands beside the vehicle body and starts the push-walking (FIG. 6: push-walking start phase), the rider J inclines the vehicle body to the side of the rider J from the upright state in order to prevent the vehicle body from falling to the opposite side as seen from the rider J (away from the rider J) (FIG. 6: inclination operation phase), and the rider J makes the vehicle body stationary at an angle of inclination that makes it easy for the rider J to perform stable push-walking, and maintains the angle (FIG. 6: stationary maintaining phase). The inclination angle (roll angle Yθ) at this time depends on push-walking conditions, such as the size of the body of the rider J or the size of the vehicle body, and the state of road surfaces. Therefore, the inclination angle is an appropriate angle for the push-walking conditions at the time, and the control device 23 sets the inclination angle to the target roll angle Yθt as described below.

Specifically, as shown in FIG. 7, at the beginning of the push-walking by the rider J, the roll angle Yθ starts to change as the rider J inclines the vehicle body to the side of the rider J from the upright state (FIG. 7: timing Ta). Then when the rider J himself makes the vehicle body stationary at an appropriate angle, the direction of change in the roll angular velocity Y is reversed (FIG. 7: timing Tb). The control device 23 detects this timing Tb based on detection information from the vehicle body acceleration sensor 31. The control device 23 then calculates the roll angle Yθ at the timing Tb by calculates an integral value of the roll angular velocity Y over a period from timing Ta to timing Tb, and sets the roll angle Yθ to the target roll angle Yθt. This allows the rider J to set an appropriate inclination of the vehicle body (roll angle Yθ) to the target roll angle Yθt.

Back to FIG. 6, when the vehicle body sways to the left or right while the rider J is performing the push-walking (FIG. 6: push-walking phase), and the deviation between the inclination angle (roll angle) and the target roll angle Yθt increases, the control device 23 performs the assist torque providing control to provide the assist torque Tw to the front-wheel suspension device 3 so as to return the inclination angle to the target roll angle Yθt.

Specifically, as shown in FIG. 7, when the vehicle body inclines to the left beyond the target roll angle Yθt due to swaying, the roll angular velocity Y also changes in a left direction (FIG. 7: timing Tb to timing Tc, and timing Td to timing Te). In this case, the control device 23 provides the front-wheel suspension device 3 with the assist torque Tw acting in the direction of turning the front wheel 2 to the right. When the front wheel 2 is turned to the right, a restoring force to restore the inclination to the left is generated in the vehicle body, so that the roll angle Yθ of the vehicle body returns to the target roll angle Yθt. When the vehicle body inclines to the right beyond the target roll angle Yθt due to swaying, the roll angular velocity Y also changes in the right direction (FIG. 7: timing Tc to timing Td). In this case, the control device 23 provides the front-wheel suspension device 3 with the assist torque Tw acting in the direction of turning the front wheel 2 to the left. When the front wheel 2 is turned to the left, a restoring force to restore the inclination to the right is generated in the vehicle body, so that the roll angle Yθ of the vehicle body returns to the target roll angle Yθt.

Here, it is known that the restoring force that restores the inclination of the vehicle body to the target roll angle Yθt increases in accordance with the centrifugal force of the front wheel 2 generated by the provision of the assist torque Tw, and the centrifugal force increases in accordance with the steering angle of the front wheel 2.

Meanwhile, when the vehicle body starts to incline to the side that is opposite to the side where the rider J is standing in the midst of the push-walking, it is more difficult for the rider J to stabilize the posture of the vehicle body than when the vehicle body starts to incline to the side where the rider J is standing. Out of the left and right sides of the vehicle body, the side where the rider J is standing is in the direction of the target roll angle Yθt (on the left side in the present embodiment). Accordingly, when the roll angle Yθ changes in the direction opposite to the direction of the target roll angle Yθt (FIG. 7: timing Tb to timing Tc), the control device 23 provides the assist torque Tw, which increases the steering angle of the front wheel 2 more than when the vehicle body inclines in the direction of the target roll angle Yθt (FIG. 7: timing Tc to timing Td and timing Tc to Timing Te). As a result, when a larger restoring force is generated on the vehicle body and inclination is generated in the direction opposite to the direction of the target roll angle Yθt, it is possible to swiftly restore the inclination and prevent the rider J from having difficulty in stabilizing the posture of the vehicle body.

The present embodiment demonstrates following effects.

The motorcycle 1 in the present embodiment includes the steering assist device 50 that generates a steering angle at the front wheel 2 in accordance with the inclination of the vehicle body in the roll direction. The steering assist device 50 sets the roll angle Yθ of when the vehicle body is inclined from an upright state to the target roll angle Yθt, and provides the assist torque Tw so that the roll angle Yθ maintains the target roll angle Yθt.

According to this configuration, the roll angle Yθ formed when the vehicle body is inclined to the side of the rider J from the upright state, for such a reason as preventing the vehicle body from falling in a direction away from the rider J, can be set to the target roll angle Yθt. Even when the vehicle body sways and the inclination of the vehicle body changes, the assist torque Tw is provided so as to maintain the inclination of the vehicle body at the target roll angle Yθt and thereby a steering angle is generated in the front wheel 2, so that the vehicle body is maintained in the state of being inclined to the side of the rider J. As a result, even when the vehicle body sways in the direction away from the rider J, the swaying of the vehicle body is appropriately controlled, so that the anxiety of the rider J about the support of the vehicle body can be eliminated.

In the steering assist device 50 of the present embodiment, when vehicle speed is equal to or more than the prescribed vehicle speed threshold K indicating a start of push-walking, the control device 23 sets the target roll angle Yθt.

According to this configuration, the target roll angle Yθt is set at the beginning of the start of the push-walking. In other words, since the target roll angle Yθt is set at each start of the push-walking, the target roll angle Yθt, suitable for the conditions of the push-walking (conditions of the rider J, the vehicle body, road surfaces, or the like) at the time, can be set.

In the steering assist device 50 of the present embodiment, the control device 23 sets the roll angle Yθ of the vehicle body of when the direction of change in roll angular velocity (Y) of the vehicle body is reversed to the target roll angle Yθt.

According to this configuration, the inclination of the vehicle body, retained at the beginning of the rider J starting the push-walking, is set to the target roll angle Yθt. Since the rider J generally retains the vehicle body at an inclination appropriate for the rider J at the beginning of the push-walking, it is possible to set such an inclination to the target roll angle Yθt.

In the steering assist device 50 of the present embodiment, when the roll angle Yθ changes in the direction opposite to the direction of the target roll angle Yθt, the control device 23 controls the steering actuator 43 to provide the assist torque Tw that makes the steering angle larger than when the roll angle Yθ changes in the direction of the target roll angle Yθt.

According to this configuration, when the vehicle body starts to incline in the direction opposite to the direction of the target roll angle Yθt due to swaying, a larger restoring force is generated, and the inclination is swiftly restrained. This means that even when the vehicle body starts to fall in the direction opposite to the direction of inclination of the vehicle body that is appropriate for the rider J, the inclination of the vehicle body is swiftly restored, so that the rider J can perform push-walking without causing the vehicle body to sway.

In the steering assist device 50 of the present embodiment, the control device 23 starts the assist torque providing control on the condition that the seat load applied to the seat 14 is equal to or less than the prescribed load threshold N.

According to this configuration, it is possible to prevent the assist torque Tw from being provided to the front-wheel suspension device 3 when the rider J is riding and not in the state of performing the push-walking.

In the steering assist device 50 of the present embodiment, the control device 23 executes the assist torque providing control on the condition that the push-walking mode is selected by operation of the mode selection switch.

According to this configuration, it is possible to prevent the assist torque Tw from being provided to the front-wheel suspension device 3 against the intention of the rider J.

The embodiment described above is merely an example of one aspect of the present invention, and any deformations and applications are possible without departing from the concept of the present invention.

In the embodiment described above, when the push-walking mode is selected, the control device 23 of the steering assist device 50 may control the steering actuator 43 to provide the assist torque Tw for slightly turning the front wheel 2 to the side that is opposite to the side where the rider J is standing at a time point when the vehicle speed is zero (km/h) at the start of the push-walking (FIG. 6: push-walking start phase) of the rider J. This generates the centrifugal force on the side where the rider J is standing as soon as the rider J starts the push-walking, so that the vehicle body tends to incline to the side of the rider J.

In the embodiment described above, the control device 23 of the steering assist device 50 may vary the target roll angle Yθt depending on a moving direction (i.e. a forward direction and a reverse direction) of the vehicle body at the time of the push-walking. This makes it possible to set an appropriate target roll angle Yθt for each moving direction of the vehicle body.

In the embodiment described above, the roll angle Yθ of the vehicle body is detected when the control device 23 computes time integration of the roll angular velocity Y that is detected by the vehicle body acceleration sensor 31. However, the configuration to detect the roll angle Yθ may be any publicly-known and well-known configurations to detect angles, and may be, for example, an angle sensor that detects the roll angle Yθ.

The function blocks shown in FIG. 4 are schematic diagrams showing the component members of the control device 23 classified according to main processing contents for easy understanding of the present invention, and the component members of the control device 23 may be classified into further more component members according to the processing contents. The component members may be classified so that one component member executes a number of processing.

The directions, such as horizontal and vertical directions and various numerical values, shapes, and materials in the embodiment described above may include the range of providing equivalent effects as these directions, numerical values, shapes, and materials (the range of so-called equivalency) unless otherwise specified.

Configurations Supported by Above Embodiment

The embodiment disclosed is a specific example of the following configurations.

(Configuration 1) A steering assist device for a saddle-riding vehicle that generates a steering angle at a steered wheel, including: a steering actuator that provides an assist torque that generates the steering angle of the steered wheel to a suspension device that supports the steered wheel; roll angle detection means that detects a roll angle that is an angle of inclination of a vehicle body in a roll direction; and control means that controls the assist torque provided by the steering actuator based on the roll angle of the vehicle body and a target roll angle that is a target value of the roll angle, in which the control means sets the roll angle of when the vehicle body is inclined from an upright state to the target roll angle.

The configuration 1 can appropriately control swaying of a vehicle body while the rider is walking by pushing the vehicle body by the hands and thereby eliminate the anxiety of the rider about the support of the vehicle body.

(Configuration 2) The steering assist device according to the configuration 1, in which when vehicle speed is equal to or more than a prescribed vehicle speed threshold indicating a start of push-walking, the control means sets the target roll angle.

The configuration 2 can set a new target roll angle at each start of the push-walking.

(Configuration 3) The steering assist device according to the configuration 1 or 2, in which the control means sets the roll angle of the vehicle body of when a direction of change in roll angular velocity of the vehicle body is reversed to the target roll angle.

The configuration 3 can set the inclination of the vehicle body, retained at the beginning of the rider starting the push-walking, to the target roll angle.

(Configuration 4) The steering assist device according to any one of the configurations 1 to 3, in which when the roll angle changes in a direction opposite to the direction of the target roll angle, the control means controls the steering actuator to provide the assist torque that makes the steering angle larger than when the roll angle changes in the direction of the target roll angle.

According to the configuration 4, when the vehicle body starts to incline in the direction opposite to the direction of the target roll angle due to swaying, a larger restoring force is generated so that the inclination can swiftly be restrained.

(Configuration 5) The steering assist device according to any one of the configurations 1 to 4, in which when a seat load applied to a seat is equal to or less than a prescribed load threshold, the control means controls to provide the assist torque.

The configuration 5 can prevent the assist torque from being provided to the suspension device when the rider is riding and not in the state of performing the push-walking.

(Configuration 6) The steering assist device according to any one of the configurations 1 to 5, including a mode selection switch sensor that detects operation on a mode selection switch for selecting a push-walking mode, in which when the push-walking mode is selected by the operation of the mode selection switch, the control means provides the assist torque.

The configuration 6 can prevent the assist torque from being provided to the suspension device against the intention of the rider.

REFERENCE SIGNS LIST

1 Motorcycle (saddle-riding vehicle)
2 Front wheel (steered wheel)
3 Front-wheel suspension device (suspension device)
5 Vehicle body frame
23 Control device (control means)
30 Vehicle speed sensor
31 Vehicle body acceleration sensor
35 Mode selection switch sensor
36 Seat load sensor
43 Steering actuator
50 steering assist device
226 Motor drive unit
300 Assist torque calculation block
J Rider
K Vehicle speed threshold
N Load threshold
Tw Assist torque
Y Roll angular velocity
Yθ Roll angle
Yθt Target roll angle

The invention claimed is:

1. A steering assist device, comprising:
a steering actuator that provides an assist torque that generates the steering angle of the steered wheel to a suspension device that supports the steered wheel;
a vehicle body acceleration sensor that detects a roll angle that is an angle of inclination of a vehicle body in a roll direction;
processor that controls the assist torque provided by the steering actuator based on the roll angle of the vehicle body and a target roll angle that is a target value of the roll angle; and
a mode selection switch sensor that detects operation on a mode selection switch for selecting a push-walking mode,
wherein
when vehicle speed is equal to or more than a prescribed vehicle speed threshold indicating a start of push-walking, the processor sets the target roll angle, and sets the roll angle of when the vehicle body is inclined from an upright state, to the target roll angle, and
when the push-walking mode is selected by the operation of the mode selection switch, the processor provides the assist torque.

2. The steering assist device according to claim 1, wherein the processor sets the roll angle of the vehicle body of when a direction of change in roll angular velocity of the vehicle body is reversed, to the target roll angle.

3. The steering assist device according to claim 1, wherein when the roll angle changes in a direction opposite to the direction of the target roll angle, the processor controls the steering actuator to provide the assist torque that makes the steering angle larger than when the roll angle changes in the direction of the target roll angle.

4. The steering assist device according to claim 1, wherein when a seat load applied to a seat is equal to or less than a prescribed load threshold, the processor controls to provide the assist torque.

* * * * *